(12) United States Patent
Kim et al.

(10) Patent No.: US 12,331,373 B2
(45) Date of Patent: Jun. 17, 2025

(54) STEEL MATERIAL, FOR PRESSURE VESSEL, SHOWING EXCELLENT HYDROGEN-INDUCED CRACKING RESISTANCE AND METHOD FOR PREPARING SAME

(71) Applicant: POSCO, Pohang-si (KR)

(72) Inventors: Dae-Woo Kim, Pohang-si (KR); Woo-Yeol Cha, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 1244 days.

(21) Appl. No.: 16/957,673

(22) PCT Filed: Dec. 24, 2018

(86) PCT No.: PCT/KR2018/016582
§ 371 (c)(1),
(2) Date: Jun. 24, 2020

(87) PCT Pub. No.: WO2019/132478
PCT Pub. Date: Jul. 4, 2019

(65) Prior Publication Data
US 2023/0212704 A1     Jul. 6, 2023

(30) Foreign Application Priority Data
Dec. 26, 2017 (KR) .................. 10-2017-0179687

(51) Int. Cl.
*C21D 9/46* (2006.01)
*C21D 8/02* (2006.01)
(Continued)

(52) U.S. Cl.
CPC ............. *C21D 9/46* (2013.01); *C21D 8/0205* (2013.01); *C21D 8/0226* (2013.01);
(Continued)

(58) Field of Classification Search
None
See application file for complete search history.

(56) References Cited

U.S. PATENT DOCUMENTS

2019/0024206 A1    1/2019   Kim
2020/0095649 A1    3/2020   Cha et al.

FOREIGN PATENT DOCUMENTS

CN      102301015 A    12/2011
CN      102317491 A     1/2012
(Continued)

OTHER PUBLICATIONS

English language machine translation of KR 20160075925 A. Generated Nov. 2, 2023. (Year: 2023).*

(Continued)

*Primary Examiner* — Brian D Walck
(74) *Attorney, Agent, or Firm* — Morgan Lewis & Bockius LLP

(57) ABSTRACT

An embodiment of the present invention provides a steel material, for a pressure vessel, comprising, in weight %, 0.06-0.25% of carbon (C), 0.05-0.50% of silicon (Si), 1.0-2.0% of manganese (Mn), 0.005-0.40% of aluminum (Al), 0.010% or less of phosphorus (P), 0.0010% or less of sulfur (S), 0.001-0.03% of niobium (Nb), 0.001-0.03% of vanadium (V), 0.001-0.03% of titanium (Ti), 0.01-0.20% of chromium (Cr), 0.05-0.15% of molybdenum (Mo), 0.01-0.50% of copper (Cu), 0.05-0.50% of nickel (Ni), 0.0005-0.0050% of magnesium (Mg), 0.0005-0.0050% of calcium (Ca), 0.0020% or less of oxygen (O), and the remainder being Fe and other unavoidable impurities. A microstructure comprises in terms of area fraction 30% or less of pearlite and the remainder being ferrite. A non-metallic inclusion contains Mg—Al—Ca—O composite oxide.

5 Claims, 2 Drawing Sheets

(51) Int. Cl.
  *C22C 38/00*  (2006.01)
  *C22C 38/06*  (2006.01)
  *C22C 38/42*  (2006.01)
  *C22C 38/44*  (2006.01)
  *C22C 38/46*  (2006.01)
  *C22C 38/48*  (2006.01)
  *C22C 38/50*  (2006.01)
  *C22C 38/58*  (2006.01)

(52) U.S. Cl.
  CPC ......... *C21D 8/0263* (2013.01); *C21D 8/0273* (2013.01); *C22C 38/002* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *C21D 2211/005* (2013.01); *C21D 2211/009* (2013.01)

(56) References Cited

FOREIGN PATENT DOCUMENTS

| | | |
|---|---|---|
| CN | 107109565 A | 8/2017 |
| CN | 110088344 A | 8/2019 |
| EP | 2208799 A1 | 7/2010 |
| EP | 2392681 A1 | 12/2011 |
| EP | 2980235 A1 | 2/2016 |
| EP | 3239320 A1 | 11/2017 |
| JP | 2001-342537 A | 12/2001 |
| JP | 2002-348609 A | 12/2002 |
| JP | 2003-013175 A | 1/2003 |
| JP | 2014-005534 A | 1/2014 |
| JP | 2016-125077 A | 7/2016 |
| JP | 2017-048443 A | 3/2017 |
| KR | 10-2010-0076727 A | 7/2010 |
| KR | 10-1150141 B1 | 6/2012 |
| KR | 10-2012-0074638 A | 7/2012 |
| KR | 10-2012-0110324 A | 10/2012 |
| KR | 10-2013-0076570 A | 7/2013 |
| KR | 10-2013-0114179 A | 10/2013 |
| KR | 10-2014-0072246 A | 6/2014 |
| KR | 10-2016-0075925 A | 6/2016 |
| KR | 10-2016-0077385 A | 7/2016 |
| KR | 10-1709033 B1 | 2/2017 |
| KR | 10-1736638 B1 | 5/2017 |
| WO | 2017/111416 A1 | 6/2017 |

OTHER PUBLICATIONS

Japanese Office Action dated Sep. 28, 2021 issued in Japanese Patent Application No. 2020-536261.
Chinese Office Action dated Nov. 24, 2021 issued in Chinese Patent Application No. 201880083867.4 (with English translation).
Chinese Office Action dated Apr. 2, 2021 issued in Chinese Patent Application No. 201880083867.4.
International Search Report issued in corresponding International Patent Application No. PCT/KR2018/016582 dated Apr. 2, 2019.
European Extended Search Report date Dec. 9, 2020 issued in European Patent Application No. 18894291.6.
M.A. Mohtadi-Bondab, et al., "Effect of different microstructural Parameters on hydrogen induced cracking in an API X70 pipeline steel", 'Metals and Materials', vol. 23, No. 4, Jul. 12, 2017, pp. 726-735.
Tongsheng Zhang, el al., " Effect of Mg Addition on the Evolution of Inclusions in Al—Ca Deoxidized Melts", ISIJ International, vol. 55. No. 8, Jan. 1, 2015, pp. 1541-1548.
H. Wang, et al., "Evolution of CaO—MgO—Al2O2 CaS—(SiO2) inclusions in H13 die steel during electroslag remelting process", 'Ironmaking & Steelmaking: Processes, Products and Applications', vol. 45, No. 1, Sep. 28, 2016, pp. 6-16.
Augusta Martinelli Miranda, et al., "Monitoring of less-common residual elements in scrap feeds for EAF steelmaking", 'Ironmaking & Steelmaking: Processes, Products and Applications', vol. 46, No. 7, Aug. 9, 2019, pp. 598-608.
Holappa L., "On Physico-Chemical and Technical Limits in Clean Steel Production", 'Steel Research International', vol. 81, No. 10, Oct. 1, 2010, pp. 869-874.
Chinese Notice of Reexamination dated May 7, 2025 issued in Chinese Patent Application No. 201880083867.4 (with English translation).
"Alloy Structural Steel," edited by Chengyun Xiang, Metallurgical Industry Press, p. 168, 1st edition, 1st printing in Aug. 1999 (with English Abstract).
Lifeng Zhang et al., "Non-metallic Inclusions and Element Segregation in Bearing Steels," Metallurgical Industry Press, 1st edition, 1st printing in Jan. 2017, pp. 107-109 (with English Abstract).
"Clean steel and clean auxiliary raw materials," edited by Deyong WANG, Metallurgical Industry Press, p. 171, 1st edition, 1st printing in Jul. 2017 (with English Abstract).

* cited by examiner

[Figure 1]
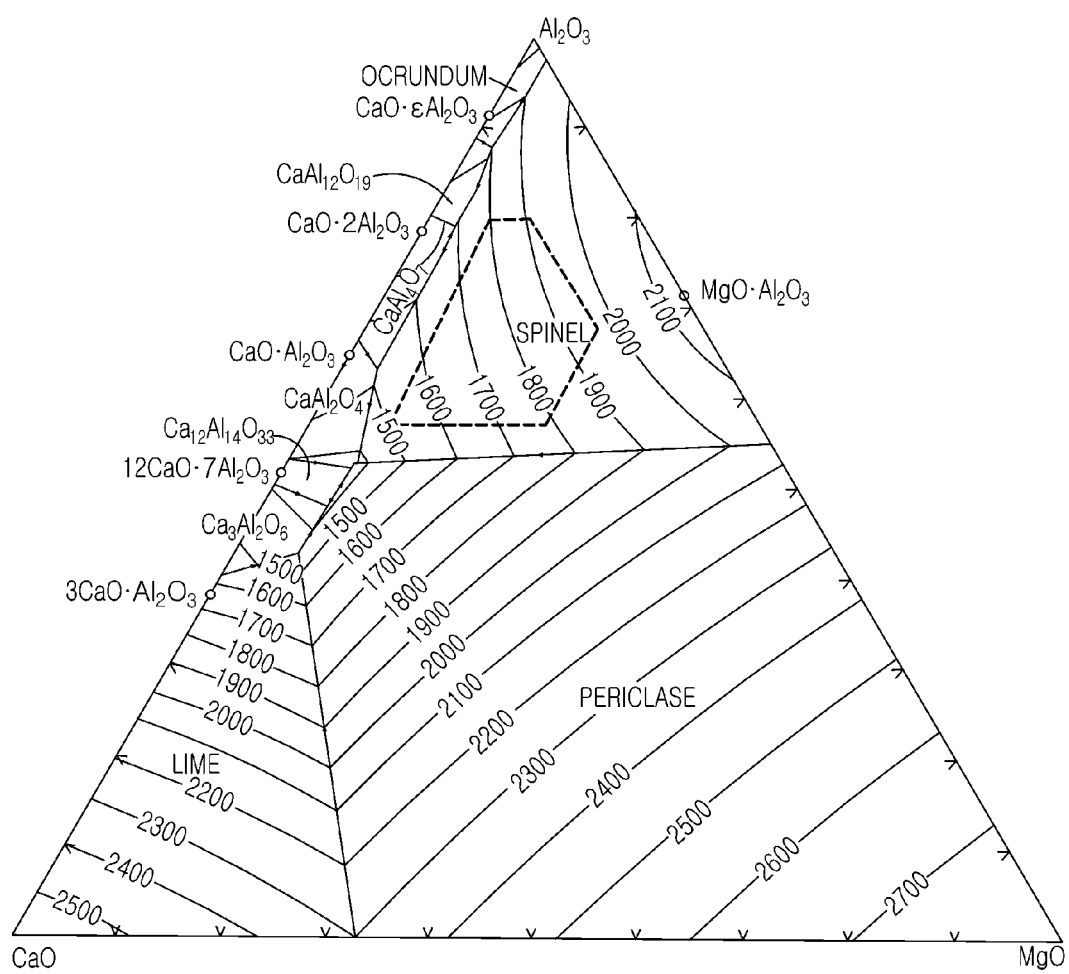

[Figure 2]
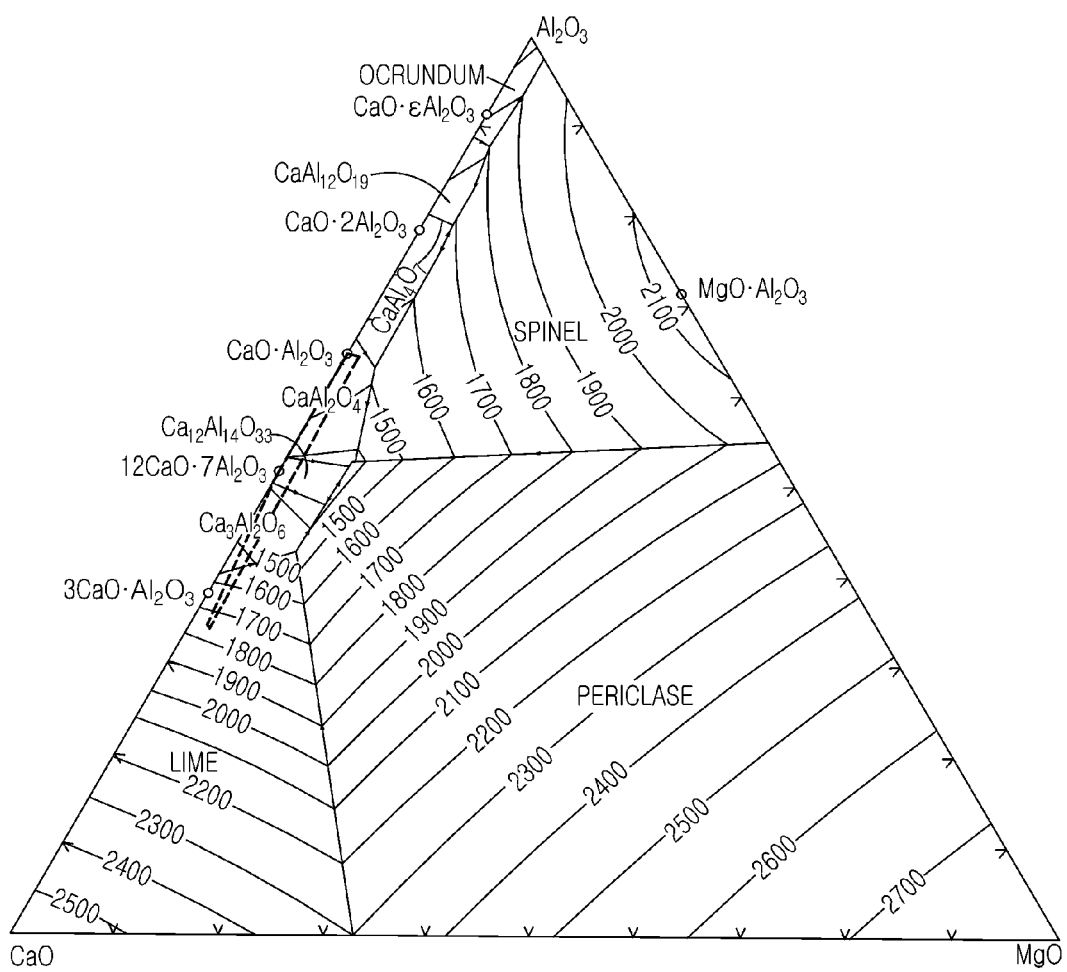

STEEL MATERIAL, FOR PRESSURE VESSEL, SHOWING EXCELLENT HYDROGEN-INDUCED CRACKING RESISTANCE AND METHOD FOR PREPARING SAME

CROSS-REFERENCE OF RELATED APPLICATIONS

This application is the U.S. National Phase under 35 U.S.C. § 371 of International Patent Application No. PCT/KR2018/016582, filed on Dec. 24, 2018, which in turn claims the benefit of Korean Application No. 10-2017-0179687, filed on Dec. 26, 2017, the entire disclosures of which applications are incorporated by reference herein.

TECHNICAL FIELD

The present invention relates to a steel material for a pressure vessel, which shows excellent hydrogen-induced cracking resistance, and a method for preparing the same.

BACKGROUND ART

In recent years, pressure-vessel steel materials used in petrochemical manufacturing facilities, storage tanks, and the like continue to manufacture large-scale facilities and heavy steel materials with an increase in usage time. To secure structural stability of weld joints with a base material in manufacturing a large structure, it tends to reduce a carbon equivalent (Ceq) and control impurities to the extreme limit.

Also, it is more difficult to secure the qualities of hydrogen-induced cracking (HIC) resistance due to increased production of crude oil containing a large amount of $H_2S$.

In particular, the steel materials used in the plant facilities for mining, processing, transporting and storing low-quality crude oil also essentially require a property of inhibiting occurrence of cracks by wet hydrogen sulfide in the crude oil.

In addition, the environmental pollution is becoming a global problem when accidents occur in the plant facilities. Since it takes an astronomical amount of money to restore the environmental pollution, the level of properties of steel materials used in the energy industry requiring the HIC resistance tends to be increasingly strict.

The hydrogen-induced cracking (HIC) of the steel material is caused based on the principle as follows.

A steel sheet corrodes when the steel sheet comes into contact with wet hydrogen sulfide contained in the crude oil, and hydrogen atoms generated by this corrosion penetrate and diffuse into steel so that the hydrogen atoms are present in the steel in an atomic state. Then, a gas pressure is formed while converting the hydrogen atoms into hydrogen molecules in the form of hydrogen gas in the steel, and brittle cracks occur due to this pressure in vulnerable structures (for example, inclusions, segregation zones, inner pores, and the like) in the steel. The steel sheet will be broken down when such cracks widen gradually to exceed a level of strength which the steel material may endure.

Therefore, as a plan to improve the hydrogen-induced cracking resistance of steel materials used at a hydrogen sulfide atmosphere, the following techniques have been proposed.

There are a first method for adding an element such as copper (Cu), and the like, a second method for minimizing a hardened structure (for example, a pearlite phase, and the like) in which cracks easily occur and spread or controlling a shape of the hardened structure, a third method for forming a matrix structure as a hard structure such as tempered martensite, tempered bainite, and the like, using water treatment such as a thermo-mechanically controlled process (TMCP), normalizing accelerated cooling tempering (NACT), quenching and tempering (QT), DQT, and the like in replacement of a processing process, in order to enhance resistance to initiation of cracks, a fourth method for controlling inner defects of inclusions and pores in steel, which may serve as points of accumulation of hydrogen and initiation of cracks, and the like.

As the first method, the technique for adding Cu has an effect of forming a stable CuS film on a surface of a material under a weakly acidic atmosphere to reduce penetration of hydrogen into the material, thereby improving hydrogen-induced cracking resistance. However, it is known that the effect caused by addition of Cu is not highly significant under a strongly acidic atmosphere. Also, it has a drawback in that surface polishing and process costs may increase because cracks occur on a surface of the steel sheet as hot cracking is caused due to the addition of Cu.

As the second method, the method for minimizing a hardened structure or controlling a shape of the hardened structure is generally a method for reducing a band index (B.I) value of a banded structure generated in a matrix phase after normalizing heat treatment to delay a crack propagation rate.

Patent Document 1 relating to such a method discloses that a ferrite+pearlite microstructure having a banding index of 0.25 or less may be obtained through processes of heating and hot rolling a slab whose alloy composition has been controlled, air-cooling the slab at room temperature, heating the slab at Ac1 to Ac3 transformation points, and slow cooling the slab, and steel having excellent HIC resistance characteristics with a tensile strength of approximately 500 MPa may be obtained by these processes.

However, the thin sheet steel having a thickness of 25 mm or less has an excessively increased rolling reduction until a thickness of a final product is obtained from a slab. Therefore, a Mn-enriched layer which has been present in a slab state is lined in the form of a band to be parallel to a rolling direction after hot rolling. Also, the structure at a normalizing temperature is composed of an austenite single phase, but the shape and concentration of the Mn-enriched layer does not vary. Therefore, it has a problem in that a banded structure in a hard phase is formed again during an air-cooling process after the heat treatment.

The third method is a method for constituting a configuration of a matrix phase as a hard phase (such as acicular ferrite, bainite, martensite, or the like) other than the ferrite+pearlite phase using a water treatment process such as TMCP, and the like.

Patent Document 2 relating to such a method discloses that the HIC resistance characteristics may be improved through processes of heating a slab whose alloy composition has been controlled, subjecting the slab to finish rolling at 700 to 850° C., subjecting the slab to accelerated cooling at a temperature of Ar3-30° C. or more, and finishing the slab at 350 to 550° C.

Patent Document 2 discloses that the slab has an enhanced rolling reduction ratio at a non-recrystallization temperature zone, and is prepared through a conventional TMCP process for obtaining a bainite or acicular ferrite structure by means of accelerated cooling, a strength of the matrix phase is enhanced, and the HIC resistance is improved by avoiding a structure vulnerable to crack propagation as in a banded structure.

However, when the alloy composition and the controlled rolling and cooling conditions presented in Patent Document 2 are applied, it is difficult to secure a proper strength after post-weld heat treatment generally applied to a steel material for a pressure vessel. Also, a region before PWHT is applied or to which PWHT is not applied may be rather vulnerable to crack initiation due to a high-density electric potential generated during generation of a low-temperature phase. In particular, it has a problem in that the HIC resistance characteristics of a pipe-forming material may be further degraded due to an increase in processing hardening rate caused during pipe formation of a pressure vessel.

The fourth method is a method for enhancing the HIC resistance characteristics by minimizing inclusions in a slab to enhance a degree of cleanness.

By way of example, Patent Document 3 discloses that a steel material having excellent HIC resistance characteristics may be prepared by adjusting a content of Ca in a range satisfying the expression $0.1 \leq \leq (T.[Ca]-(17/18) \times T.[O]-1.25 \times S)/T[O] \leq \leq 0.5)$ when Ca is added into the molten steel.

The Ca serves to partially improve the HIC resistance characteristics by spheroidizing a shape of MnS inclusions, which may be a starting point for HIC cracking, and reacting with S in the steel to form CaS. However, when Ca is introduced at an excessive amount or is out of proportion with $Al_2O_3$, particularly when CaO is present at a high ratio, the HIC resistance characteristics may be degraded. Also, in the case of the thin sheet steel, the coarsened oxidative inclusions are broken down due to a high cumulative rolling reduction ratio during a rolling process depending on the composition and shape of the inclusions, and may be finally in the form dispersed lengthwise in a rolling direction. In this case, it has a drawback in that the HIC resistance characteristics may be degraded because the ends of the dispersed inclusions have a very high stress concentration due to a hydrogen partial pressure.

Up to now, as described in Patent Document 3, Ca treatment technology has been developed to improve the hydrogen-induced cracking resistance performance by reducing a sulfur ingredient in the steel material for inhibiting formation of MnS to an extreme limit of 0.001% by weight or less and simultaneously preventing the remaining S from forming MnS during coagulation. Because MnS that is a sulfide has a property of being elongated in a rolling direction during a rolling process, hydrogen may be accumulated on starting and tailing ends of the MnS whose elongation has been completed, thereby causing cracking. In this case, the hydrogen-induced cracking caused by the MnS may be inhibited by converting the MnS into CaS in order to inhibit formation of cracks. Because CaS maintains a spherical shape without being elongated during a rolling process, locations in which hydrogen is accumulated are dispersed to inhibit occurrence of hydrogen-induced cracks. However, a composite oxide containing both Ca and Al is formed by a reaction of $Al_2O_3$ inclusions, which are necessarily generated while controlling the sulfur ingredient in the steel material to 0.001% by weight or less, with CaO generated by oxidation of Ca due to the side effects caused by the Ca treatment. A number of techniques for controlling a CaO composition in such a composite oxide to improve the hydrogen-induced cracking resistance performance have been developed as the conventional techniques. For example, Patent Document 4, and the like disclose a preparation method capable of improving the hydrogen-induced cracking resistance characteristics by controlling the CaO composition of the inclusions.

However, the conventional Ca treatment technology deals mainly with an increase in actual yield and a decrease in concentration of S upon addition of Ca to deal with inhibition of MnS formation, but it is not easy to achieve a sufficient level of hydrogen-induced cracking resistance in this way.

Therefore, the conventional methods as described above have limitations in manufacturing a steel material for a pressure vessel having hydrogen-induced cracking (HIC) resistance characteristics using a steel material having a tensile strength of approximately 550 MPa after the steel material is subjected to PWHT.

RELATED ART DOCUMENT

Patent Document 1: Korean Patent Laid-Open Publication No. 2010-0076727
Patent Document 2: Japanese Patent Laid-Open Publication No. 2003-013175
Patent Document 3: Japanese Patent Laid-Open Publication No. 2014-005534
Patent Document 4: Korean Patent No. 1150141

DISCLOSURE

Technical Problem

An object of the present invention is to provide a steel material showing high strength and excellent hydrogen-induced cracking resistance after post-weld heat treatment (PWHT) and a method for preparing the same.

Technical Solution

In one general aspect, a steel material for pressure vessel includes, in percent by weight, 0.06 to 0.25% of carbon (C), 0.05 to 0.50% of silicon (Si), 1.0 to 2.0% of manganese (Mn), 0.005 to 0.40% of aluminum (Al), 0.010% or less of phosphorus (P), 0.0010% or less of sulfur (S), 0.001 to 0.03% of niobium (Nb), 0.001 to 0.03% of vanadium (V), 0.001 to 0.03% of titanium (Ti), 0.01 to 0.20% of chromium (Cr), 0.05 to 0.15% of molybdenum (Mo), 0.01 to 0.50% of copper (Cu), 0.05 to 0.50% of nickel (Ni), 0.0005 to 0.0050% of magnesium (Mg), 0.0005 to 0.0050% of calcium (Ca), 0.0020% or less of oxygen (O), and the balance of Fe and other unavoidable impurities, wherein a microstructure includes, in an area fraction, 30% or less of pearlite and the balance of ferrite, and non-metallic inclusions contain a Mg—Al—Ca—O composite oxide.

In another general aspect, a method for preparing a steel material for a pressure vessel includes preparing molten steel; continuously casting the molten steel to obtain a steel slab; heating the slab; subjecting the slab to sizing rolling at a temperature of 1,100 to 1,130° C. to obtain a bar; cooling the bar; re-heating the bar; subjecting the bar to finish hot rolling at a temperature of 900 to 1,050° C. to obtain a hot-rolled steel sheet; cooling the hot-rolled steel sheet; and subjecting the hot-rolled steel sheet to normalizing heat treatment, wherein the preparing of the molten steel includes introducing a Mg-containing Al alloy into molten steel for treatment; introducing Ca into the molten steel for treatment; and introducing Mg into the molten steel for treatment, wherein this procedure is performed to obtain molten steel which includes, in percent by weight, 0.06 to 0.25% of carbon (C), 0.05 to 0.50% of silicon (Si), 1.0 to 2.0% of manganese (Mn), 0.005 to 0.40% of aluminum (Al), 0.010% or less of phosphorus (P), 0.0010% or less of sulfur (S), 0.001 to 0.03% of niobium (Nb), 0.001 to 0.03% of vanadium (V), 0.001 to 0.03% of titanium (Ti), 0.01 to 0.20% of chromium (Cr), 0.05 to 0.15% of molybdenum (Mo), 0.01 to 0.50% of copper (Cu), 0.05 to 0.50% of nickel (Ni), 0.0005 to 0.0050% of magnesium (Mg), 0.0005 to 0.0050% of calcium (Ca), 0.0020% or less of oxygen (O), and the balance of Fe and other unavoidable impurities.

Advantageous Effects

According to one aspect of the present invention, a steel material suitable as a material for a pressure vessel can be provided because the steel material shows excellent resistance to hydrogen-induced cracking and can secure a high tensile strength even after PWHT as well.

DESCRIPTION OF DRAWINGS

FIG. 1 is a ternary phase diagram showing an exemplary composition range of hard inclusions included in a steel material provided according to one embodiment of the present invention.

FIG. 2 is a phase diagram showing a composition range of inclusions formed in conventional steel.

BEST MODE

Hereinafter, the present invention will be described in detail.

Unless specifically stated otherwise, the contents of components in the present invention are based on weight. Unless specifically stated otherwise, the ratios of structures, inclusions or the like are also based on area. Unless specifically stated otherwise, the temperature of a slab, a bar, or a steel material (including a steel sheet) in the present invention also represent a temperature measured at a quarter of the thickness (also referred to as '¼t').

The present inventors have conducted profound research to provide a steel material capable of being suitably used for the purpose of refining, transporting and storing crude oils and the like because the steel material has a high tensile strength and also shows excellent resistance to hydrogen-induced cracking. As a result, the present inventors have confirmed that when a matrix phase is formed from microstructures and precipitates by optimizing an alloy composition and preparation conditions to control formation of inclusions and simultaneously properly controlling the preparation conditions, a steel material for a pressure vessel showing excellent HIC resistance characteristics without any decrease in strength after PWHT. Therefore, the present invention has been completed based on these facts.

In particular, the present invention has attempted to get a grip on the prior-art problems, find a cause of the problems and most effectively solve the problems in order to improve the HIC resistance characteristics.

That is, the problem unnoticed in the prior art when the formation of the inclusions is controlled to improve the HIC resistance characteristics is to inhibit the breakup of a composite oxide containing both Ca and Al remaining in the molten steel. When the Ca treatment is performed to inhibit MnS generation, not only CaS but also a Ca—Al—O-based spherical composite oxide are formed. They have a problem in that they may be broken down during rolling because they maintain their spherical shape but show insufficient hardness. Because such a broken composite oxide becomes an oxide extending in the form of dots, hydrogen is accumulated in micro-voids generated from the broken oxide. This causes hydrogen-induced cracking in products. To deal with this problem, when the Ca—Al—O-based composite oxide is removed, the problem may be solved. However, when Ca is added into the steel in which the $Al_2O_3$-based inclusions are present, it is very difficult to sufficiently remove an oxide having this composition. Therefore, the conventional techniques may somewhat deal with the inhibition of MnS generation, but has limitations in solving an additional problem caused by addition of Ca for this purpose, thereby making it impossible to provide a steel material having sufficient hydrogen-induced cracking resistance.

One embodiment of the present invention solves the causes of these problems, and thus provides a steel material showing high resistance to hydrogen-induced cracking.

Hereinafter, the present invention will be described in detail. First, an alloy composition of the present invention will be described. Unless specifically stated otherwise, the contents of the following alloy compositions mean the percent by weight.

Carbon (C): 0.06 to 0.25%

Carbon (C) is the most important element to secure the strength of steel, and thus is preferably contained in a suitable range in the steel. According to the present invention, when carbon (C) is added at 0.06% or more, it is possible to secure a desired level of strength. However, when the content is greater than 0.25%, an increase in degree of central segregation is caused, and a martensite or MA phase or the like other than the ferrite and pearlite structures may be formed after normalizing heat treatment, thereby causing an excessive increase in strength or hardness. In particular, the HIC resistance characteristics may be degraded during formation of the MA phase. Therefore, in the present invention, the content of C may be limited to 0.06 to 0.25%, more preferably 0.10 to 0.20%, and even more preferably 0.10 to 0.15%.

Silicon (Si): 0.05 to 0.50%

Silicon (Si) is a substitutional element that improves the strength of a steel material through solid-solution strengthening and has a potent deoxidization effect, and thus is an element essential for preparation of clean steel. For this purpose, it is desirable that Si is added at a content of 0.05% or more. However, when Si is added at a high content, an MA phase may be formed, and an excessive increase in strength of a ferrite matrix may be caused, thereby causing degradation of HIC resistance characteristics, impact toughness, and the like. As a result, the upper limit of the Si content is preferably limited to 0.50%. Therefore, in the present invention, the content of Si may be limited to 0.05 to 0.50%, more preferably 0.05 to 0.40%, and even more preferably 0.20 to 0.35%.

Manganese (Mn): 1.0 to 2.0%

Manganese (Mn) is an element useful in improving the strength by means of solid-solution strengthening. For this purpose, it is desirable that Mn is added at a content of 1.0% or more. However, when the content is greater than 2.0%, central segregation may be enhanced to increase a fraction of MnS inclusions formed with S, thereby causing degradation of hydrogen-induced cracking resistance by the inclusions. Therefore, in the present invention, the content of Mn may be limited to 1.0 to 2.0%, more preferably 1.0 to 1.7%, and even more preferably 1.0 to 1.5%.

Aluminum (Al): 0.005 to 0.40%

In addition to the Si, aluminum (Al) is one of potent deoxidizing agents in a steel-making process. For this purpose, it is desirable that Al is added at a content of 0.005% or more. However, when the content is greater than 0.40%, an excessive increase in fraction of $Al_2O_3$ in the oxidative inclusions generated as the product of deoxidization may be caused, and thus the size of $Al_2O_3$ may coarsen, and it is difficult to remove $Al_2O_3$ during refinement, thereby causing degradation of hydrogen-induced cracking resistance by the oxidative inclusions. Therefore, in the present invention, the content of Al may be limited to 0.005 to 0.40%, more preferably 0.1 to 0.40%, and even more preferably 0.1 to 0.35%.

Phosphorus (P): 0.010% or less

Phosphorus (P) is an element that causes brittleness at the grain boundary or forms coarse inclusions to cause brittleness. To improve resistance to propagation of brittle cracks in steel, the content of P may be limited to 0.010% or less.

Sulfur (S): 0.0010% or less

Sulfur (S) is also an element that causes brittleness at the grain boundary or forms coarse inclusions to cause brittleness. To improve resistance to propagation of brittle cracks in steel, the content of S is preferably limited to 0.0010% or less. Also, when the content of S is greater than 0.0010%, a large amount of Ca is required to prevent formation of MnS, which makes it impossible to secure a desired composition of the inclusions in the present invention because the composition of the inclusions is converted into a composition containing a large amount of CaO.

Niobium (Nb): 0.001 to 0.03%

Niobium (Nb) precipitates in the form of NbC or NbCN to improve the strength of a base material, and also has an effect of miniaturizing an initial grain size of austenite by increasing a recrystallization temperature to enhance a non-recrystallization rolling reduction ratio. For this purpose, it is desirable that Nb is added at a content of 0.001% or more. However, when the content is excessive, undissolved Nb is generated in the form of TiNb(C,N) and causes degradation of hydrogen-induced cracking resistance as well as UT defects and degradation of impact toughness. As a result, the content is preferably limited to 0.03% or less. Therefore, in the present invention, the content of Nb may be limited to 0.001 to 0.03%, more preferably 0.005 to 0.02%, and even more preferably 0.007 to 0.015%.

Vanadium (V): 0.001 to 0.03%

Vanadium (V) is almost all solution-reannealed during reheating of a slab, and thus has a poor reinforcing effect caused by precipitation or solution annealing in a subsequent rolling process, but has an effect of precipitating in the form of very fine carbonitrides in a heat treatment process such as PWHT, and the like to improve the strength. For this purpose, it is necessary that V is added at a content of 0.001% or more. However, when the content is greater than 0.03%, an excessive increase in strength and hardness of a weld joint may be caused, and thus may serve as a cause of surface cracks and the like during pressure vessel processing. Also, it has a problem in that it may be disadvantageous in economic aspects due to a sudden increase in manufacturing costs. Therefore, in the present invention, the content of V is preferably limited to 0.001 to 0.03%, more preferably 0.005 to 0.02%, and even more preferably 0.007 to 0.015%.

Titanium (Ti): 0.001 to 0.03%

Titanium (Ti) is an element that precipitates in the form of TiN during reheating of a slab and inhibits crystal grain growth at a base material and a weld heat-affected zone to greatly improve low-temperature toughness. For this purpose, it is desirable that Ti is added at a content of 0.001% or more. However, when the content is greater than 0.03%, the low-temperature toughness may be lowered due to clogging of nozzles for continuous casting or central crystallization. Also, when Ti binds to N to form coarse TiN precipitates at a thickness center of the slab, it may serve as a point of initiation for hydrogen-induced cracking, which is not desirable. Therefore, in the present invention, the content of Ti is preferably limited to 0.001 to 0.03%, more preferably 0.010 to 0.025%, and even more preferably 0.010 to 0.018%.

Chromium (Cr): 0.01 to 0.20%

Chromium (Cr) has a poor effect of enhancing yield strength and tensile strength by means of solution annealing, but has an effect of preventing a decrease in strength by delaying a degradation rate of cementite during tempering or PWHT heat treatment. For this purpose, it is desirable that Cr is added at a content of 0.01% or more. However, when the content is greater than 0.20%, an increase in size and fraction of Cr-rich coarse carbides such as $M_{23}C_6$ and the like may be caused, which results in significantly degraded impact toughness, increased manufacturing costs, and degraded weldability. Therefore, in the present invention, the content of Cr is preferably limited to 0.01 to 0.20%.

Molybdenum (Mo): 0.05 to 0.15%

Molybdenum (Mo) is an element that is effective for preventing a decrease in strength during tempering or PWHT heat treatment as in the Cr, and has an effect of preventing degradation toughness caused by grain boundary segregation of impurities such as P, and the like. Also, it is a solid-solution strengthening element in ferrite, and thus has an effect of enhancing the strength of a matrix phase. For this purpose, it is desirable that Mo is added at a content of 0.05% or more. However, because Mo is also an expensive element, a significant increase in manufacturing costs may be caused when it is added at an excessive amount. As a result, the upper limit of the Mo content is preferably limited to 0.15%.

Copper (Cu): 0.01 to 0.50%

Copper (Cu) is an element that is advantageous in the present invention because Cu has an effect of greatly improving the strength of a matrix phase through solid-solution strengthening in ferrite as well as inhibiting corrosion under a wet hydrogen sulfide atmosphere. To obtain the aforementioned effect sufficiently, it is desirable that Cu is added at a content of 0.01% or more. However, when the content is greater than 0.50%, it has a high probability to cause star cracks on a surface of steel, and a significant increase in manufacturing costs may be caused because it is an expensive element. Therefore, in the present invention, the content of Cu is preferably limited to 0.01 to 0.50%.

Nickel (Ni): 0.05 to 0.50%

Nickel (Ni) is an element that is important for increasing stacking faults at a low temperature to easily form a cross slip with electric potential in order to improve impact toughness and hardenability, thereby causing an increase in strength. For this purpose, it is desirable that Ni is added at a content of 0.05% or more. However, when the content is greater than 0.50%, an excessive increase in hardenability may be caused, but an increase in manufacturing costs may be caused because it is more expensive than other hardenability-improving elements, which is not desirable. Therefore, in the present invention, the content of Ni is preferably limited to 0.05 to 0.50%, more preferably 0.10 to 0.40%, and even more preferably 0.10 to 0.30%.

Magnesium (Mg): 0.0005 to 0.0050%

Magnesium (Mg) is an important element that is not commonly used as an alloying element, a precipitate-forming element, or the like but is used to change a composition of the oxidative inclusions in the present invention, and is required to form a high-hardness Mg—Al—Ca—O composite oxide other than brittle inclusion of conventional CaO—Al$_2$O$_3$. When the Mg content is less than or equal to 0.0005% by weight, it is impossible to generate a high-hardness oxide. On the other hand, when the Mg content is greater than or 0.005% by weight, problems such as an excessive processing time and an increase in alloy manufacturing costs may be caused. Therefore, the Mg content is preferably limited to 0.0005 to 0.005% by weight.

Calcium (Ca): 0.0005 to 0.0050%

When calcium (Ca) is added after deoxidization by Al, Ca binds to S forming MnS inclusions to inhibit generation of MnS, and also has an effect of forming spherical CaS to inhibit generation of cracks through hydrogen-induced cracking. In the present invention, Ca is preferably added at a content of 0.0005% or more in order to sufficiently form S contained as the impurities into CaS. However, when Ca is added at an excessive amount, the composition of the inclusions is converted into a composition containing an excessive amount of CaO, which may be elongated and broken down during rolling to facilitate hydrogen-induced cracking. As a result, the upper limit of the Ca content is preferably limited to 0.0050%. Therefore, in the present invention, the content of Ca may be limited to 0.0005 to 0.0050%.

Oxygen (O): 0.0020% or less

This steel type should be extremely desulfurized to inhibit MnS generation, and has good efficiency when a concentration of oxygen in molten steel should be extremely lowered for desulfurization. Therefore, oxygen dissolved in the molten steel is very small, and thus the total amount of oxygen contained in the inclusions is equal to the total oxygen value in the steel material. In the present invention, the composition of the inclusions may be controlled to improve hardness of the inclusions, thereby preventing the inclusions from being broken down during rolling. However, because the HIC resistance quality may be degraded as the total amount of the entire inclusions increases, the total amount of the inclusions is preferably limited. Therefore, the content of O is preferably less than or equal to 0.002%.

The remaining component of the present invention is iron (Fe). However, because unintended impurities are inevitably mixed from raw materials or surrounding environments in a conventional preparation process, it is difficult to exclude these impurities. Because these impurities may be recognized in the conventional preparation process by those skilled in the art, all the contents thereof are not particularly described in this specification.

According to the present invention, the steel material may further include 0.0020 to 0.0060% of nitrogen (N) in addition to the aforementioned components. The N binds to Ti upon one pass of large heat input welding such as electro-gas welding (EGW) of steel (steel sheet) to form precipitates, and thus has an effect of improving CGHAZ toughness. When an amount of nitrogen is less than or equal to 0.002%, it is impossible to form precipitates such as TiN. On the other hand, when the amount of nitrogen is greater than or equal to 0.006%, an increase in content of free nitrogen may be caused. As a result, because impact toughness and the like may be degraded, it is very important to match a stoichiometric ratio. Therefore, the content of N is preferably in a range of 0.002 to 0.006%.

Meanwhile, according to one embodiment of the present invention, the steel material is used to secure hydrogen-induced cracking resistance, and thus the non-metallic inclusions preferably include a Mg—Al—Ca—O composite oxide. That is, because the Mg—Al—Ca—O-based composite oxide has high hardness compared to the Ca—Al—O-based composite oxide, the Mg—Al—Ca—O-based composite oxide may be broken down and thus may not be elongated even when a rolling force applied to the steel material during a rolling process is transferred to the inclusions including the Mg—Al—Ca—O-based composite oxide. Because the Mg—Al—Ca—O-based composite oxide forms an ultra-hard phase referred to as "spinel," the Mg—Al—Ca—O-based composite oxide may not be broken down under a load transferred during rolling, but the present invention is not particularly limited thereto. In one embodiment of the present invention, the Ca, Al, and Mg components in the non-metallic inclusions including the composite oxide may be defined as follows. That is, when it is assumed that the sum of the CaO, Al$_2$O$_3$, and MgO oxide contents is set to 100%, the composite oxide included in the steel material according to one embodiment of the present invention may have a composition which satisfies an R1/M1 ratio ranging from 4.0 to 19.0, satisfies an R2/A1 ratio ranging from 0.3 to 0.7, and satisfies an R3/C1 ratio ranging from 1.9 to 9.0. That is, each of the ratios referred herein is obtained from an average composition of the inclusions included in the steel material. In this case, after the composition of the inclusions is analyzed, the sum of the CaO, Al$_2$O$_3$, and MgO contents among others is set to 100% to obtain modified compositions, and each of the ratios is calculated from an average value of the modified compositions. Here, the average value refers to a value obtained by dividing the sum of the compositions for oxides of inclusions to be analyzed by the number of the inclusions (hereinafter referred to as the same).

(wherein the C1 represents a content of CaO (which may be calculated from the equation: CaO content/(CaO content+Al$_2$O$_3$ content+MgO content) when it is assumed that the sum of the CaO, Al$_2$O$_3$, and MgO oxide contents is set to 100%), Al represents a content of Al$_2$O$_3$ (CaO content/(CaO content+Al$_2$O$_3$ content+MgO content), and M1 represents a content of MgO (CaO content/(CaO content+Al$_2$O$_3$ content+MgO content), provided that it is meant that R1=C1+A1, R2=C1+M1, and R3=A1+M1.)

According to one embodiment of the present invention, the average value of the inclusion compositions may be referred to as an average value of values obtained by selecting inclusions having a size of 5 μm or more from the corresponding inclusions in a field of view with a size of 1 cm×1 cm under a scanning electron microscope and analyzing compositions of the selected inclusions.

In one embodiment of the present invention, the contents of CaO, Al$_2$O$_3$, and MgO in the aforementioned composite oxide may be analyzed using a scanning electron microscope (SEM).

FIG. 1 is a CaO—Al$_2$O$_3$—MgO ternary phase diagram showing an exemplary composition region (as indicated by a dotted line in the drawing) of non-metallic inclusions satisfying the aforementioned requirements. As can be seen in the drawing, all the non-metallic inclusions satisfying the compositional requirements according to one embodiment of the present invention are included in a very hard spinel composition region. On the contrary, the conventional non-metallic inclusions shown in FIG. 2 are merely positioned in a Ca—Al—O (CaO—Al$_2$O$_3$) region (a region indicated by a dotted line). In this case, these inclusions are likely to be broken down during rolling, and thus exist as fine inclusions.

Also, because the fine non-metallic inclusions have a nature of being not easily broken down even when they have a somewhat low hardness, the non-metallic inclusions whose compositions are to be controlled according to one embodiment of the present invention targets inclusions having a size of (a circle equivalent diameter) of 5 μm or more.

When the non-metallic inclusions are controlled as described above, the Mg—Al—Ca—O composite oxide is not broken down during rolling reduction due to the very high hardness of the Mg—Al—Ca—O composite oxide. Therefore, as a defective region in which hydrogen in the steel material is concentrated gets smaller, no hydrogen-induced cracking (HIC) defects occur. When the composition of the inclusions is out of each of the ranges as defined above, precipitates whose compositions show low hardness may be crystallized and broken down during a rolling process to function as an accumulation zone of hydrogen atoms, hydrogen-induced cracking is caused. According to one embodiment of the present invention, the inclusions including the Mg—Al—Ca—O-based composite oxide may include up to 5% of other oxides in addition to the oxides such as MgO, $Al_2O_3$, and CaO. The content of the oxides having different compositions refers to an average composition obtained from the results obtained by analyzing the compositions of the inclusions (in this case, a process in which the sum of CaO, $Al_2O_3$, and MgO is set to 100% is not performed). These oxides may be included in the inclusions by means of molten steel or an alloy added to slag, refractories, or molten steel, and like.

Therefore, according to one embodiment of the present invention, no finely broken inclusions exist substantially in the steel material.

Also, according to one embodiment of the present invention, a microstructure of the steel material may include, in an area fraction, 30% or less of pearlite and the balance of ferrite. As described above, the microstructure may be controlled to secure a proper tensile strength (TS) of 485 to 550 MPa and a low-temperature impact toughness of 100 J or more at −50° C. Meanwhile, when the pearlite structure is greater than 30%, it is impossible to secure the low-temperature impact toughness. Also, when pearlite is formed in the form of a band, the resistance to propagation with respect to hydrogen-induced cracking may be degraded. In one embodiment of the present invention, the ratio of the pearlite may be greater than or equal to 10%, preferably 15%, in order to achieve a sufficient strength.

In addition, according to one embodiment of the present invention, one or two carbonitrides selected from Nb and V, which have a diameter ranging from 5 to 30 nm, may be included at 0.01 to 0.02% in the microstructure, based on the sum of the area ratios thereof. Because the carbides or carbonitrides whose diameters fall within the ranges as described above have an effect of preventing a decrease in strength upon heat treatment such as PWHT, and the like, the carbides or carbonitrides are preferably included at 0.01% by area or more. However, when each of the fractions is greater than 0.02% by area, an increase in fraction of a hard phase such as MA or martensite in the weld heat-affected zone may be caused, which makes it impossible to properly secure weld joint impact toughness. According to one embodiment of the present invention, the carbides or carbonitrides may be one or more precipitates selected from the group consisting of NbC, Nb(C,N), VC, and V(C,N).

Meanwhile, when cementite between bainite interfaces is present in a platelet phase after stress-relieving heat treatment or post-weld heat treatment (PWHT), it may act as a zone of initiation for hydrogen-induced cracking. Therefore, in one embodiment of the present invention, the cementite may be mainly present in a spheroidized form.

Also, the steel material provided according to one embodiment of the present invention may show excellent hydrogen-induced cracking resistance as well as have a tensile strength of 485 MPa or more after post-weld heat treatment (PWHT).

Hereinafter, a method for preparing a steel material of the present invention will be described.

First, molten steel is prepared. The preparing of the molten steel may include introducing a Mg-containing Al alloy into molten steel for treatment; introducing Ca into the molten steel for treatment; and introducing Mg into the molten steel for treatment.

Here, the molten steel for treatment may not have completely the same composition as that of the steel according to one embodiment of the present invention. This reason is that, because the elements such as Al, Mg, Ca, and the like are to be introduced into the molten steel, as described above, these components are not identical, and thus an alloy element may be introduced during or after the preparing of the molten steel for treatment to adjust the additional components. However, after the preparing of the molten steel is completed, the molten steel may have the same composition as the composition of the steel according to the present invention. The molten steel for treatment may be molten steel refined in a converter, or may be molten steel refined in an electric furnace.

A desulfurization process is one of the most important processes to secure the HIC resistance characteristics of the steel of the present invention. To promote a desulfurization reaction, it is preferred to maintain a concentration of oxygen in the molten steel at a very low level. For this purpose, a Mg-containing Al alloy is introduced into the molten steel during converter tapping to remove oxygen remaining in the molten steel. In the present invention, the Mg content of the Mg-containing Al alloy is preferably controlled at 5 to 10% by weight. Mg is added in relative consideration of an optimal amount of a Mg wire alloy additionally introduced in a subsequent process. In this case, when the content of Mg in the Al alloy is less than 5%, it is difficult to secure a content of MgO in the inclusions to a desired level. On the other hand, when the content of Mg is greater than 10%, a MgO single phase precipitates due to an excessive increase in the content of MgO in the inclusions, thereby causing degradation of the HIC resistance characteristics. Also, a large amount of fume may be generated during a deoxidization process, and molten steel may be increasingly scattered, which results in poor workability. Considering these aspects, the Mg content of the Mg-containing Al alloy is more preferably in a range of 5 to 8% by weight, and even more preferably in a range of 6 to 7%. Also, an amount of the Mg-containing Al alloy introduced may be determined in consideration of a difference between an Al content of molten steel before its introduction and a target Al content, the Al actual yield, and the like. In this case, this may be performed in a manner defined in a conventional steel-making process, but the present invention is not particularly limited thereto.

Ca is introduced into the molten steel for treatment into which the Mg-containing Al alloy is introduced. Ca may be introduced using a method such as powder injection, Ca wire injection, and the like, but the present invention is not particularly limited thereto. Here, the Ca wire refers to a wire including a Ca-based powder in a steel sheet. The Ca wire may be introduced into the molten steel to inhibit precipitation of MnS, thereby improving the HIC resistance characteristics. In one embodiment of the present invention, a desulfurization process may be performed to control a concentration of S in the molten steel before introduction of the Ca wire at 0.001% or less. In this way, the Ca wire may be introduced to the minimum to inhibit formation of MnS. In this way, it is also possible to control a concentration of CaO in the inclusions to an extent proposed in the present invention. Meanwhile, the composition of the inclusions in the molten steel is controlled as a Mg—Al—O composition by introducing a Mg-containing Al deoxidizing agent during the aforementioned deoxidization process of molten steel, but is converted into a material containing a large amount of CaO and including MgO—$Al_2O_3$ as the residual material, depending on the Ca treatment. Then, the composition is converted into a Mg—Al—Ca—O inclusion composition containing a large amount of MgO by means of a process of introducing Mg.

In this case, an introduction velocity of the Ca wire may be in a range of 100 to 250 m/min. That is, when the introduction velocity of the Ca wire is less than 100 m/min., Ca is melted above a ladle to reduce an effect of a ferrostatic pressure. This is because the actual yield of Ca is lowered to cause an increase in amount of Ca introduced. On the other hand, when the introduction velocity of the Ca wire is greater than 250 m/min., the Ca wire comes into contact with the bottom base of the ladle, and thus refractories of the ladle may be lost by melting, which make it impossible to secure working stability. Therefore, the introduction velocity of the Ca wire is preferably in a range of 100 to 250 m/min., more preferably 120 to 200 m/min., and even more preferably 140 to 180 m/min.

Also, the Ca wire may be introduced so that an amount of Ca included in the Ca wire may be in a range of 0.00005 to 0.00050 kg/ton (i.e., 0.00005 to 0.00050 kg per one ton of the molten steel). When the amount of Ca introduced is less than 0.00005 kg/ton, MnS may be generated at a central part during coagulation, resulting in degraded hydrogen-induced cracking resistance. On the other hand, when the amount of Ca introduced is greater than 0.00050 kg/ton, Ca may react with the $Al_2O_3$ component of the refractories to accelerate the melting loss of the refractories, which makes it difficult to secure productivity and makes it impossible to secure working stability. Therefore, the amount of Ca introduced is preferably in a range of 0.00005 to 0.00050 kg/ton, more preferably 0.00010 to 0.00040 kg/ton, and even more preferably 0.00015 to 0.00030 kg/ton. Metallic Ca, or a Ca alloy such as CaSi, FeCa, Fe—Ca—Si, Fe—Ca—Ba—Si, and the like may be used as Ca included in the Ca wire. However, a Ca alloy having a high actual yield is preferably used to minimize the throughput of Ca. Therefore, in a preferred method of introducing Ca, it is desirable to melt Ca at the bottom base of the ladle using a wire feeding apparatus to increase an actual yield in the molten steel.

Next, Mg may be introduced into the molten steel for treatment to control formation of non-metallic inclusions. As described above, the composite inclusions include a Mg—Al—Ca—O component, but still have an insufficient content of Mg such that the composite inclusions are converted into hard inclusions which are not broken down even during rolling. Therefore, a process of additionally adding Mg is performed. In this case, Mg is difficult to introduce because it has low solubility and a high vapor pressure in the molten steel. Therefore, Mg is preferably alloyed into a Ni—Mg or Si—Mg form, which is then introduced into the molten steel. Various methods such as powder injection, a method of wire introduction, or the like may be used as a method of introducing Mg. In one embodiment of the present invention, the Mg may be introduced using the method of wire introduction. Here, the Mg wire refers to a wire including a Mg-based powder in the steel sheet. In this case, an introduction velocity of the Mg wire in the molten steel is preferably controlled at 150 to 300 m/min. in order to secure the actual yield of Mg. Because Mg has a high vapor pressure at a molten steel temperature, it is necessary to inhibit evaporation of Mg using a ferrostatic pressure of the molten steel. When the introduction velocity of the Mg wire is less than 150 m/min., Mg is melted above a ladle to reduce an effect of a ferrostatic pressure. Therefore, the actual yield of Mg is lowered to cause an increase in amount of Mg introduced. On the other hand, when the introduction velocity of the Mg wire is greater than 300 m/min., the Mg wire comes into contact with the bottom base of the ladle, and thus refractories of the ladle may be lost by melting, which make it impossible to secure working stability. Therefore, it is desirable that the introduction velocity of the Mg wire is preferably in a range of 150 to 300 m/min. More preferably, the introduction velocity of the Mg wire is in a range of 180 to 250 m/min., and even more preferably 200 to 220 m/min.

Also, an amount of the Mg wire introduced is preferably in a range of 0.00003 to 0.00015 kg/ton (i.e., 0.00003 to 0.00015 kg per one ton of the molten steel), based on the amount of Mg. When the amount of the Mg wire introduced is less than 0.00003 kg/ton, a concentration of MgO in the inclusions is not sufficiently secured, and thus the inclusions may be broken down during rolling reduction, which makes it impossible to secure the hydrogen-induced cracking resistance. On the other hand, when the amount of the Mg wire introduced is greater than 0.00015 kg/ton, a MgO single phase in the inclusions may precipitate, which makes it unavoidable to break the inclusions. Therefore, it is desirable that the amount of the Mg wire introduced is preferably in a range of 0.00003 to 0.00015 kg/ton, more preferably 0.00005 to 0.00012 kg/ton, and even more preferably 0.00007 to 0.00010 kg/ton.

In one embodiment of the present invention, the method may further include performing bubbling during or after introduction of the elements such as Al, Ca, Mg, and the like in one or more of the respective introduction steps so that the corresponding elements may be uniformly mixed in the molten steel. The bubbling refers to an operation performed to allow a gas to blow in the molten steel and agitate the molten steel. In particular, when the bubbling is performed during the introducing of the Ca wire, the formed Ca—Al—O-based inclusions may be removed to the possible maximum by means of flotation separation, thereby minimizing the problems caused by the breakdown of such inclusions.

Then, the molten steel may be continuously cast to obtain a steel slab, and the steel slab may be rolled to obtain a steel material of the present invention. Rolling conditions are not particularly limited as long as they are used in a method of obtaining the steel material of the present invention. For example, one of the rolling conditions according to one embodiment of the present invention is as follows.

A rolling method according to one embodiment of the present invention may include preparing a slab; heating the slab; subjecting the heated slab to sizing rolling to obtain a bar; re-heating the bar; subjecting the bar to finish rolling to obtain a steel material. Hereinafter, each of the steps may be described in detail.

The steel slab is heated to 1,150° C. to 1,300° C. A heating temperature of the steel slab is preferably greater than or equal to 1,150° C. This is made, first, to subject carbonitrides of Ti or Nb or coarse crystal products of Ti, Nb(C,N) formed during casting, and the like to solution reannealing, and, second, to maximize a grain size of austenite by heating austenite to a recrystallization temperature or more after the sizing rolling and maintaining the recrystallization temperature. However, when the slab is heated to an excessively high temperature, problems caused by oxide scales at a high temperature may occur. In this case, because an excessive increase in manufacturing costs may be caused due to an increase in production cost for heating and maintenance, the upper limit of the heating temperature of the steel slab is preferably 1,300° C.

The re-heated slab is subjected to sizing rolling to obtain a bar having the maximum thickness of 120 mm, and then air-cooled to room temperature. The sizing rolling may reduce a tendency of the inclusions to be broken down during rolling by lowering generation of a banded structure according to an increase in rolling reduction ratio during the finish hot rolling and reducing a rolling reduction ratio at a low temperature. Also, when the finish hot rolling is performed without performing the sizing rolling, the oxidative inclusions may be broken down due to the cumulative rolling reduction ratio at a non-recrystallization region, and thus may act as a point of initiation for hydrogen-induced cracking. To achieve this sizing rolling effect, a termination temperature of the sizing rolling may be between 950° C. and 1,150° C. That is, the termination temperature of the sizing rolling may be greater than or equal to 950° C. in order to perform the sizing rolling while inhibiting the breakdown of the inclusions to the best extent possible, and the termination temperature of the sizing rolling may be less than or equal to 1,150° C. in order to achieve a sizing rolling effect without preventing coarsening of crystal grains of austenite.

When the thickness of the bar is greater than 120 mm after the sizing rolling is terminated, a ratio of the thickness of the final steel sheet to the thickness of the bar may increase during the finish rolling to increase the rolling reduction ratio. As a result, the bar is increasingly likely to be finish-rolled at a non-recrystallization region. As the non-recrystallization/rolling reduction ratio increases, the hydrogen-induced cracking resistance characteristics may be degraded due to the breakdown of the oxidative inclusions in austenite before normalizing. Also, the thickness of the bar may be set in a range of 80 mm or more in order to prevent the breakdown of the inclusions during the sizing rolling.

Also, according to one embodiment of the present invention, a separate rough rolling process may be performed before the sizing rolling, when necessary.

The bar is re-heated to 1,150 to 1,200° C. A re-heating temperature of the bar in an intermediate rolling state before the finish hot rolling is preferably greater than or equal to 1,150° C. This is made to prevent the breakdown of the inclusions caused by an excessive decrease in temperature during the finish rolling. However, when the re-heating temperature is excessively high, a growth rate of precipitate phases (such as TiN, and the like) generated at a high temperature may be speeded up. Therefore, the re-heating temperature is preferably less than or equal to 1,200° C.

The heated bar is subjected to finish hot rolling in a temperature range of 900 to 1,050° C., and then air-cooled to room temperature to obtain a steel material (a hot-rolled steel sheet). As is the case of the sizing rolling, the coarse composite inclusions generated in a refinement process should accept modification caused by rolling as the strength of the steel sheet increases with a decreasing rolling temperature. As a result, the inclusions are broken down or segmented to smaller inclusions, or the inclusions such as MnS are elongated in a lengthwise direction. Because such elongated or segmented inclusions directly cause occurrence or propagation of hydrogen-induced cracks, the finish rolling may be terminated at 900° C. or higher. However, when the finish rolling temperature is greater than or equal to 1,050° C., the crystal grains of austenite may grow after the rolling is terminated, and the generated precipitates of Nb or V may also have a problem such as an increase in diameter. Therefore, the finish hot rolling temperature is preferably in a range of 900 to 1,050° C. The steel material subjected to the finish rolling may have a thickness of 5 to 65 mm in consideration of the use of the resulting steel material.

The cooling of the steel material may follow the termination of the rolling. In this case, according to one embodiment of the present invention, the steel material may be cooled by air-cooling.

Meanwhile, when a dissolved hydrogen amount in the molten steel is greater than or equal to 1.3 ppm, the air-cooling may be performed after the finish rolling by cooling the steel material by multi-piling until the steel material is cooled from a temperature of 200° C. or higher to room temperature. When the cooling by multi-piling is performed as described above, hydrogen dissolved in the steel material may be released to more effectively inhibit inner microcracks by hydrogen, thereby finally improving the hydrogen-induced cracking resistance characteristics.

The air-cooled hot-rolled steel sheet is subjected to normalizing heat treatment in which the steel sheet is heated to a temperature range of 850 to 950° C. for 10 to 60 minutes, and then air-cooled to room temperature. Here, a heating temperature of the hot-rolled steel sheet is based on a temperature of the thickness center of the hot-rolled steel sheet. The normalizing heat treatment may be performed to secure desired physical properties. When the temperature is less than 850° C. or a retention time of the center of the steel sheet is less than 10 minutes upon the normalizing heat treatment, carbides generated during cooling after the rolling or impure elements segregated at the grain boundary may not be easily solution-reannealed, resulting in severely degraded low-temperature toughness of the steel material after the heat treatment. Also, when the normalizing heat treatment temperature is greater than 950° C. or the heat treatment time is greater than 60 minutes, austenite may coarsen and the precipitate phases such as Nb(C,N), V(C,N), and the like may coarsen, resulting in degraded strength after PWHT. Therefore, in the present invention, the temperature is preferably limited to 850 to 950° C. during the normalizing heat treatment. Also, the retention time in this temperature range is preferably in a range of 10 to 60 minutes after the temperature of the steel sheet reaches the target temperature based on the center of the steel sheet.

Also, according to one embodiment of the present invention, when the thickness of the finally obtained steel material is greater than or equal to 10 mm, the sizing rolling may be omitted, and the finish rolling may be directly performed, when necessary. In this case, the rolling method may include preparing a slab; heating the slab; subjecting the slab to finish rolling to obtain a steel material.

MODE FOR INVENTION

Hereinafter, the present invention will be described in further detail with reference to embodiments thereof. However, it should be understood that the following embodiments are just provided to illustrate and describe the present invention in detail, but are not intended to limit the scope of the present invention. This is because the scope of the present invention is determined by the scope of the claims and matters reasonably inferred therefrom.

EXAMPLES

Molten steel having an alloy composition listed in Tables 1 and 2 below was prepared, and then continuously cast to prepare a steel slab having a thickness of 300 mm. The detailed conditions for introducing a Mg-containing Al alloy, a Ca wire, and a Mg wire upon preparation of the molten steel are as follows. That is, when the molten steel was prepared, the Mg-containing Al alloy was introduced based on the conditions listed in Table 3 below so that the content of Al in cast pieces satisfy target compositions listed in Table 1. Thereafter, the Ca wire was introduced into molten steel at an introduction velocity of 170 m/min. so that an amount of Ca introduced was 0.00030 kg per one ton of the molten steel. However, in the case of Comparative Examples 9 and 10, the Ca wire was introduced so that the amounts of Ca introduced were 0.00001 kg and 0.00002 kg, respectively, per one ton of the molten steel. After the introduction of the Ca wire was completed, the Mg wire was introduced into the molten steel at a rate of 200 m/min. The amounts of Mg introduced through the Mg wire are separately listed in Table 3. The contents of nitrogen (N) are not separately indicated in Table 1, but are all in a range of 0.0035 to 0.0060%. In this case, a significant difference according to the N content was not found, and thus a description thereof is omitted.

The steel slab was subjected to sizing rolling and hot rolling under the conditions listed in Table 3 below to prepare a steel sheet having a thickness of 10 mm.

All rolling reduction ratios per one pass for the final three passes during the sizing rolling was set to 10 to 13%, the cumulative rolling reduction ratios of 30% or more were applied, and the strain rate was controlled to a range of 1.0 to 1.7/s. In all Examples, a bar was heated to 1,200° C. after the sizing rolling, and then subjected to finish hot rolling under the conditions listed in Table 3. After the finish hot rolling was terminated, all the steel sheets were subjected to multi-piling under an insulation cover at a temperature of 200° C. or higher for 90 hours or more, and subjected to normalizing heat treatment at 890° C. for a time of period listed in Table 3 below.

For the steel sheet thus prepared, the non-metallic inclusions, microstructures, and precipitates were measured. The results are listed in Tables 4 and 5 below. Then, the tensile strength and HIC resistance were evaluated to measure a crack length ratio (CLR) and crack thickness ratio (CTR). The results are listed in Table 5 below. In Table 4, a composition of the inclusions having a size of 5 μm or more in a field of view with a size of 1 cm×1 cm was analyzed using EDS. Thereafter, on the assumption that the sum of CaO, Al2O3, and MgO contents was set to 100%, C1, A1, and M1 of each inclusion were calculated, and their average values were finally used as C1, A1, and M1, respectively. However, it can be seen that the average contents of other oxides other than the CaO, $Al_2O_3$, and MgO oxides in each inclusion was less than or equal to 5%. The HIC resistance evaluation was performed in NACE TM0284 Solution "A", and the HIC resistance index was also according to the NACE standard codes. That is, a lengthwise hydrogen-induced crack length ratio (CLR, %) of a sheet was evaluated, according to the related international standard NACE TM0284, from values obtained by dipping specimens in a 5% NaCl+0.5% $CH_3COOH$ solution saturated with $H_2S$ gas at an atmospheric pressure of 1 for 96 hours, measuring lengths and areas of cracks using an ultrasonic scanning method, and dividing the sum of the lengths of the cracks and the sum of the areas of the cracks in a lengthwise direction of the specimens by the total length and the total area of the specimens, respectively. Also, the CTR is a ratio obtained by dividing the sum of lengths of respective cracks in a thickness direction of a specimen by the thickness of the specimen.

To evaluate the post-weld heat treatment (PWHT) characteristics, the resulting steel material was subjected to a PWHT process under the following conditions. A hot-rolled steel sheet was heated to 425° C., and then, warmed from the temperature to 595 to 630° C. at a heating rate of 55 to 100° C./hr. Thereafter, the hot-rolled steel sheet was maintained at this temperature for 60 to 180 minutes, cooled to 425° C. at the same rate as the warming rate, and then air-cooled to room temperature. To check a change in strength of the steel sheet by means of PWHT, the tensile strengths of the steel material before and after PWHT treatment were compared. The results are listed in Table 5.

TABLE 1

| Item | Alloy composition (% by weight) | | | | | | | |
|---|---|---|---|---|---|---|---|---|
| | C | Si | Mn | Al | P | S | Nb | V |
| Inventive Steel 1 | 0.18 | 0.35 | 1.13 | 0.035 | 0.0080 | 0.0008 | 0.007 | 0.001 |
| Inventive Steel 2 | 0.17 | 0.31 | 1.12 | 0.031 | 0.0070 | 0.0006 | 0.01 | 0.001 |
| Inventive Steel 3 | 0.18 | 0.32 | 1.21 | 0.032 | 0.0051 | 0.0005 | 0.011 | 0.001 |
| Inventive Steel 4 | 0.19 | 0.35 | 1.09 | 0.033 | 0.0083 | 0.0005 | 0.001 | 0.007 |
| Inventive Steel 5 | 0.17 | 0.36 | 1.1 | 0.035 | 0.0075 | 0.0005 | 0.001 | 0.012 |
| Inventive Steel 6 | 0.2 | 0.33 | 1.17 | 0.036 | 0.0081 | 0.0004 | 0.005 | 0.016 |
| Comparative Steel 1 | 0.29 | 0.35 | 1.15 | 0.031 | 0.0081 | 0.0009 | 0.007 | 0.007 |
| Comparative Steel 2 | 0.16 | 0.33 | 2.15 | 0.032 | 0.0080 | 0.0006 | 0.015 | 0.015 |
| Comparative Steel 3 | 0.18 | 0.37 | 1.12 | 0.031 | 0.0071 | 0.0022 | 0.001 | 0.013 |
| Comparative Steel 4 | 0.15 | 0.35 | 1.1 | 0.035 | 0.0083 | 0.0008 | 0.0005 | 0.0007 |
| Comparative Steel 5 | 0.18 | 0.31 | 1.15 | 0.031 | 0.0070 | 0.0008 | 0.006 | 0.001 |
| Comparative Steel 6 | 0.17 | 0.33 | 1.16 | 0.035 | 0.0071 | 0.0009 | 0.001 | 0.001 |
| Comparative Steel 7 | 0.19 | 0.36 | 1.23 | 0.036 | 0.0081 | 0.0007 | 0.004 | 0.019 |
| Comparative Steel 8 | 0.2 | 0.38 | 1.31 | 0.031 | 0.0062 | 0.0006 | 0.001 | 0.015 |
| Comparative Steel 9 | 0.15 | 0.39 | 1.15 | 0.017 | 0.0083 | 0.0008 | 0.006 | 0.012 |
| Comparative Steel 10 | 0.16 | 0.35 | 1.1 | 0.03 | 0.0063 | 0.0006 | 0.001 | 0.007 |
| Inventive Steel 7 | 0.18 | 0.3 | 1.12 | 0.038 | 0.0088 | 0.0007 | 0.015 | 0.006 |
| Inventive Steel 8 | 0.17 | 0.31 | 1.25 | 0.039 | 0.0075 | 0.0010 | 0.001 | 0.007 |

TABLE 1-continued

| | Alloy composition (% by weight) | | | | | | | |
|---|---|---|---|---|---|---|---|---|
| Item | C | Si | Mn | Al | P | S | Nb | V |
| Inventive Steel 9 | 0.18 | 0.35 | 1.27 | 0.035 | 0.0070 | 0.0009 | 0.017 | 0.015 |
| Inventive Steel 10 | 0.2 | 0.33 | 1.1 | 0.031 | 0.0065 | 0.0010 | 0.001 | 0.019 |
| Inventive Steel 11 | 0.17 | 0.34 | 1.18 | 0.035 | 0.0060 | 0.0006 | 0.007 | 0.008 |
| Inventive Steel 12 | 0.16 | 0.35 | 1.19 | 0.036 | 0.0059 | 0.0004 | 0.013 | 0.015 |

TABLE 2

| | Alloy composition (% by weight) | | | | | | | |
|---|---|---|---|---|---|---|---|---|
| Item | Ti | Cr | Mo | Cu | Ni | Mg | Ca | O |
| Inventive Steel 1 | 0.011 | 0.01 | 0.05 | 0.05 | 0.1 | 0.0008 | 0.0035 | 0.00091 |
| Inventive Steel 2 | 0.001 | 0.01 | 0.05 | 0.01 | 0.25 | 0.0011 | 0.0027 | 0.00078 |
| Inventive Steel 3 | 0.01 | 0.02 | 0.07 | 0.01 | 0.15 | 0.0035 | 0.0021 | 0.00065 |
| Inventive Steel 4 | 0.012 | 0.05 | 0.08 | 0.03 | 0.07 | 0.0025 | 0.0023 | 0.00073 |
| Inventive Steel 5 | 0.005 | 0.01 | 0.08 | 0.2 | 0.12 | 0.0027 | 0.0016 | 0.00061 |
| Inventive Steel 6 | 0.007 | 0.03 | 0.11 | 0.25 | 0.08 | 0.0023 | 0.0030 | 0.00082 |
| Comparative Steel 1 | 0.013 | 0.1 | 0.12 | 0.35 | 0.35 | 0.0019 | 0.0022 | 0.00075 |
| Comparative Steel 2 | 0.01 | 0.01 | 0.06 | 0.05 | 0.15 | 0.0027 | 0.0022 | 0.00073 |
| Comparative Steel 3 | 0.011 | 0.02 | 0.07 | 0.1 | 0.13 | 0.0035 | 0.0032 | 0.00069 |
| Comparative Steel 4 | 0.007 | 0.01 | 0.06 | 0.11 | 0.19 | 0.0033 | 0.0034 | 0.00079 |
| Comparative Steel 5 | 0.001 | 0.01 | 0.05 | 0.01 | 0.1 | 0.0034 | 0.0013 | 0.00079 |
| Comparative Steel 6 | 0.013 | 0.07 | 0.06 | 0.009 | 0.12 | 0.0041 | 0.0014 | 0.00065 |
| Comparative Steel 7 | 0.001 | 0.08 | 0.06 | 0.05 | 0.15 | 0.0001 | 0.0022 | 0.00072 |
| Comparative Steel 8 | 0.013 | 0.01 | 0.06 | 0.01 | 0.17 | 0.0003 | 0.0023 | 0.00071 |
| Comparative Steel 9 | 0.015 | 0.05 | 0.06 | 0.01 | 0.15 | 0.0001 | 0.0004 | 0.00085 |
| Comparative Steel 10 | 0.012 | 0.03 | 0.07 | 0.01 | 0.181 | 0.0002 | 0.0003 | 0.00065 |
| Inventive Steel 7 | 0.001 | 0.06 | 0.07 | 0.03 | 0.25 | 0.0043 | 0.0022 | 0.00073 |
| Inventive Steel 8 | 0.016 | 0.07 | 0.08 | 0.15 | 0.23 | 0.0038 | 0.0026 | 0.00059 |
| Inventive Steel 9 | 0.003 | 0.01 | 0.05 | 0.05 | 0.12 | 0.0031 | 0.0024 | 0.00071 |
| Inventive Steel 10 | 0.011 | 0.05 | 0.05 | 0.07 | 0.1 | 0.0039 | 0.0032 | 0.00063 |
| Inventive Steel 11 | 0.005 | 0.01 | 0.06 | 0.05 | 0.13 | 0.0019 | 0.0039 | 0.00069 |
| Inventive Steel 12 | 0.005 | 0.01 | 0.06 | 0.07 | 0.1 | 0.0044 | 0.0018 | 0.00075 |

TABLE 3

| | | Preparation of molten steel | | | Sizing rolling | | Finish | |
|---|---|---|---|---|---|---|---|---|
| Item | Steel No. | Mg content in Mg-containing Al alloy (% by weight) | Amount of Mg introduced by Mg wire (Kg/ton) | Slab-heating temperature (° C.) | Rolling temperature (° C.) | Bar thickness (mm) | hot rolling temperature (° C.) | Normalizing time (min) |
| Inventive Example 1 | Inventive Steel 1 | 7 | 0.000042 | 1151 | 1,100 | 111 | 978 | 12 |
| Inventive Example 2 | Inventive Steel 2 | 9 | 0.00003 | 1173 | 1112 | 100 | 988 | 11 |
| Inventive Example 3 | Inventive Steel 3 | 10 | 0.000035 | 1211 | 1128 | 111 | 984 | 20 |
| Inventive Example 4 | Inventive Steel 4 | 5 | 0.000034 | 1218 | 1115 | 100 | 995 | 25 |
| Inventive Example 5 | Inventive Steel 5 | 6 | 0.00012 | 1180 | 1,100 | 112 | 976 | 30 |
| Inventive Example 6 | Inventive Steel 6 | 6 | 0.00003 | 1181 | 1091 | 119 | 983 | 18 |
| Comparative Example 1 | Comparative Steel 1 | 8 | 0.00014 | 1192 | 1142 | 109 | 975 | 17 |
| Comparative Example 2 | Comparative Steel 2 | 10 | 0.00013 | 1182 | 1115 | 99 | 977 | 16 |
| Comparative Example 3 | Comparative Steel 3 | 10 | 0.00013 | 1183 | 1117 | 95 | 953 | 11 |
| Comparative Example 4 | Comparative Steel 4 | 9 | 0.00013 | 1187 | 1132 | 100 | 1012 | 9 |
| Comparative Example 5 | Comparative Steel 5 | 9 | 0.00013 | 1165 | 1105 | 111 | 1021 | 11 |

TABLE 3-continued

| | | Preparation of molten steel | | | Sizing rolling | | Finish | |
|---|---|---|---|---|---|---|---|---|
| | | Mg content in | Amount of Mg | | | | | |
| Item | Steel No. | Mg-containing Al alloy (% by weight) | introduced by Mg wire (Kg/ton) | Slab-heating temperature (° C.) | Rolling temperature (° C.) | Bar thickness (mm) | hot rolling temperature (° C.) | Normalizing time (min) |
| Comparative Example 6 | Comparative Steel 6 | 7 | 0.00014 | 1183 | 1102 | 108 | 995 | 20 |
| Comparative Example 7 | Comparative Steel 7 | 6 | 0.00001 | 1135 | 1151 | 109 | 987 | 12 |
| Comparative Example 8 | Comparative Steel 8 | 8 | 0.00002 | 1155 | 1122 | 107 | 973 | 19 |
| Comparative Example 9 | Comparative Steel 9 | 2 | 0.00002 | 1187 | 1125 | 111 | 945 | 21 |
| Comparative Example 10 | Comparative Steel 10 | 3 | 0.00002 | 1188 | 1175 | 108 | 947 | 22 |
| Comparative Example 11 | Inventive Steel 7 | 10 | 0.00009 | 1011 | 988 | 187 | 910 | 30 |
| Comparative Example 12 | Inventive Steel 8 | 10 | 0.00008 | 1285 | 1157 | 57 | 987 | 31 |
| Comparative Example 13 | Inventive Steel 9 | 7 | 0.00012 | 1162 | 1131 | 95 | 785 | 40 |
| Comparative Example 14 | Inventive Steel 10 | 8 | 0.00014 | 1164 | 1085 | 87 | 801 | 19 |
| Comparative Example 15 | Inventive Steel 11 | 7 | 0.00012 | 1213 | 993 | 91 | 984 | 181 |
| Comparative Example 16 | Inventive Steel 12 | 9 | 0.00013 | 1189 | 1073 | 93 | 935 | 155 |

TABLE 4

| | Mg—Al—Ca—O composite oxide (units: %) | | | | | | | | |
|---|---|---|---|---|---|---|---|---|---|
| Item | C1 | A1 | M1 | R1 | R2 | R3 | R1/M1 | R2/A1 | R3/C1 |
| Inventive Example 1 | 33 | 58 | 9 | 91 | 42 | 57 | 10.1 | 0.7 | 2.0 |
| Inventive Example 2 | 32 | 59 | 9 | 91 | 41 | 68 | 10.1 | 0.7 | 2.1 |
| Inventive Example 3 | 33 | 62 | 5 | 95 | 38 | 67 | 19.0 | 0.6 | 2.0 |
| Inventive Example 4 | 22 | 70 | 8 | 92 | 30 | 78 | 11.5 | 0.4 | 3.5 |
| Inventive Example 5 | 14 | 75 | 11 | 89 | 25 | 86 | 8.1 | 0.3 | 6.1 |
| Inventive Example 6 | 15 | 70 | 15 | 85 | 30 | 85 | 5.7 | 0.4 | 5.7 |
| Comparative Example 1 | 13 | 69 | 18 | 82 | 31 | 87 | 4.6 | 0.4 | 6.7 |
| Comparative Example 2 | 17 | 68 | 15 | 85 | 32 | 83 | 5.7 | 0.5 | 4.9 |
| Comparative Example 3 | 18 | 70 | 12 | 88 | 30 | 82 | 7.3 | 0.4 | 4.6 |
| Comparative Example 4 | 17 | 73 | 10 | 90 | 27 | 83 | 9.0 | 0.4 | 4.9 |
| Comparative Example 5 | 16 | 72 | 12 | 88 | 28 | 84 | 7.3 | 0.4 | 5.3 |
| Comparative Example 6 | 15 | 77 | 8 | 92 | 23 | 85 | 11.5 | 0.3 | 5.7 |
| Comparative Example 7 | 25 | 73 | 2 | 98 | 27 | 75 | 49.0 | 0.4 | 3.0 |
| Comparative Example 8 | 22 | 77 | 1 | 99 | 23 | 78 | 99.0 | 0.3 | 3.5 |
| Comparative Example 9 | 7 | 89 | 4 | 96 | 11 | 93 | 24.0 | 0.1 | 13.3 |
| Comparative Example 10 | 8 | 90 | 2 | 98 | 10 | 92 | 49.0 | 0.1 | 11.5 |
| Comparative Example 11 | 18 | 70 | 12 | 88 | 30 | 82 | 7.3 | 0.4 | 4.6 |
| Comparative Example 12 | 19 | 72 | 9 | 91 | 28 | 81 | 10.1 | 0.4 | 4.3 |
| Comparative Example 13 | 22 | 71 | 7 | 93 | 29 | 78 | 13.3 | 0.4 | 3.5 |
| Comparative Example 14 | 14 | 72 | 14 | 86 | 28 | 86 | 6.1 | 0.4 | 6.1 |
| Comparative Example 15 | 13 | 69 | 18 | 82 | 31 | 87 | 4.6 | 0.4 | 6.7 |
| Comparative Example 16 | 15 | 66 | 19 | 81 | 34 | 85 | 4.3 | 0.5 | 5.7 |

C1 represents a content of CaO, A1 represents a content of $Al_2O_3$, and M1 represents a content of MgO, provided that it is meant that R1 = C1 + A1, R2 = C1 + M1, and R3 = A1 + M1.

TABLE 5

| Item | Microstructure (% by area) | | Fraction of precipitates with size of 5 to 30 nm (%) | Tensile strength (MPa) | | HIC resistance characteristics | |
|---|---|---|---|---|---|---|---|
| | pearlite | ferrite | | Before PWHT | After PWHT | CLR (%) | CTR (%) |
| Inventive Example 1 | 18 | 82 | 0.011 | 512 | 504.1 | 0 | 0 |
| Inventive Example 2 | 17 | 83 | 0.015 | 498.6 | 490.7 | 0.1 | 0 |
| Inventive Example 3 | 18 | 82 | 0.013 | 520.9 | 513.1 | 0 | 0 |
| Inventive Example 4 | 19 | 81 | 0.011 | 528.4 | 520.5 | 0 | 0 |
| Inventive Example 5 | 18 | 82 | 0.013 | 528.3 | 520.5 | 0 | 0 |
| Inventive Example 6 | 20 | 80 | 0.012 | 570.7 | 562.9 | 0 | 0 |
| Comparative Example 1 | 31 | 69 | 0.015 | 625.3 | 599.4 | 13 | 3.3 |
| Comparative Example 2 | 16 | 84 | 0.012 | 596.6 | 588.8 | 37 | 17 |
| Comparative Example 3 | 18 | 82 | 0.017 | 533.5 | 525.6 | 49 | 13 |
| Comparative Example 4 | 14 | 86 | 0.0002 | 484.2 | 461.4 | 0.1 | 0 |
| Comparative Example 5 | 17 | 83 | 0.012 | 504.9 | 497.1 | 39 | 8.8 |
| Comparative Example 6 | 17 | 83 | 0.012 | 509.8 | 507.9 | 45 | 5.5 |
| Comparative Example 7 | 16 | 84 | 0.015 | 498.5 | 490.7 | 37 | 7.3 |
| Comparative Example 8 | 18 | 82 | 0.018 | 522.8 | 514.9 | 29 | 6.3 |
| Comparative Example 9 | 18 | 82 | 0.017 | 549.4 | 541.6 | 31 | 8.4 |
| Comparative Example 10 | 19 | 81 | 0.015 | 558.7 | 550.9 | 29 | 8.4 |
| Comparative Example 11 | 16 | 84 | 0.016 | 511.2 | 503.3 | 22 | 7.9 |
| Comparative Example 12 | 17 | 83 | 0.017 | 505 | 497.2 | 19 | 5.5 |
| Comparative Example 13 | 18 | 82 | 0.018 | 520.4 | 512.6 | 13 | 8.3 |
| Comparative Example 14 | 17 | 83 | 0.016 | 533.4 | 525.6 | 19 | 5.9 |
| Comparative Example 15 | 17 | 83 | 0.013 | 558.8 | 484.7 | 0 | 0 |
| Comparative Example 16 | 18 | 82 | 0.001 | 548 | 477.2 | 0.1 | 0 |

Precipitates represent one or more carbides or carbonitrides selected from the group consisting of NbC, Nb (C, N) VC, V(C, N).

As can be seen from the results as described above, it can be seen that Inventive Examples 1 to 6 satisfying the requirements of the present invention showed excellent resistance (CLR: less than 10%, and CTR: less than 3%) to hydrogen-induced cracking and did not have a significantly decreased strength even after PWHT.

However, Comparative Example 1 is the case where C was added at an excessive content exceeding the range specified in the present invention. In this case, it showed a high pearlite ratio in the structure. As a result, the tensile strength before PWHT was excessively high, and CLR and CTR were also 13% and 3.3%, respectively, indicating that it did not show good hydrogen-induced cracking resistance. Comparative Example 2 is the case where the Mn content was high. In this case, it showed excessively high tensile strength similarly to that of Comparative Example 1, and also had poor HIC resistance characteristics. Comparative Example 3 is the case where the S content was high. As a result, the HIC resistance characteristics were poor. Also, in Comparative Example 4, the Nb and V contents were insufficient. In this case, a fraction of the Nb- and V-based precipitates having a size of 5 to 30 nm was smaller than the value specified in the present invention. Therefore, the strength after PWHT was approximately 461 MPa, which was lower than a desired level. Comparative Example 5 is the case where the Ca content is insufficient. In this case, because it was impossible to obtain a sufficient spheroidization effect of MnS, the resistance to hydrogen-induced cracking was poor. Comparative Example 6 is the case wherein the Cu and Ca contents are insufficient. In this case, the resistance to hydrogen-induced cracking was not good. Comparative Examples 7 and 8 are the cases where the Mg content in the Mg-containing Al alloy is insufficient and an amount of the Mg wire introduced is insufficient. As a result, the Mg contents in the steel materials were just 0.0001% and 0.0002%, respectively. Accordingly, the compositions of the inclusions were not controlled in a range specified in the present invention, resulting in poor hydrogen-induced cracking resistance. Comparative Examples 9 and 10 are the cases where the MgO content (M1) and the CaO content (C1) are low so that the entire parameters do not satisfy the requirements according to the present invention. As a result, the resistance to hydrogen-induced cracking was very poor. Also, Comparative Example 11 is the case where the slab has a low heating temperature, and thus the rolling reduction ratio is reduced during the sizing rolling, resulting in a very high thickness of the bar. In the subsequent finish rolling step, the rolling reduction ratio increased, resulting in poor hydrogen-induced cracking resistance. This was assumed because the formed composite inclusions were broken down in the finish rolling step. Comparative Example 12 is the case where the rolling temperature during the sizing rolling is excessively high, and the rolling reduction ratio for the bar during the sizing rolling is excessively high. In this case, the hydrogen-induced cracking resistance was poor. This was assumed because some of the inclusions were broken down during a rolling process. Comparative Examples 13 and 14 are the cases where the finish hot rolling temperature is very low. This was assumed that a load applied to the inclusions during the rolling increased to cause the breakdown of the inclusions. As a result, the hydrogen-induced cracking resistance was not good. Comparative Examples 15 and 16 are the cases where the normalizing time is too long. In this case, the coarsening of the precipitates occurred. As a result, it was shown that the tensile strength after PWHT was very low, and the impact toughness of a welded HAZ part was not good. Particularly in Comparative Example 16, it was shown that the ratio of the precipitates with a proper size was very low.

The invention claimed is:

1. A steel material for a pressure vessel, comprising, in percent by weight, 0.10 to 0.25% of carbon (C), 0.05 to 0.50% of silicon (Si), 1.0 to 2.0% of manganese (Mn), 0.005 to 0.40% of aluminum (Al), 0.010% or less of phosphorus (P), 0.0010% or less of sulfur (S), 0.001 to 0.03% of niobium (Nb), 0.001 to 0.03% of vanadium (V), 0.001 to 0.03% of titanium (Ti), 0.01 to 0.20% of chromium (Cr), 0.05 to 0.15% of molybdenum (Mo), 0.01 to 0.50% of copper (Cu), 0.05 to 0.50% of nickel (Ni), 0.0005 to 0.0050% of magnesium (Mg), 0.0005 to 0.0050% of calcium (Ca), 0.0020% or less of oxygen (O), and the balance of Fe and other unavoidable impurities,

- wherein a microstructure comprises, in an area fraction, 30% or less of pearlite and the balance of ferrite,
- wherein the steel material includes non-metallic inclusions containing a Mg—Al—Ca—O composite oxide, and
- wherein the Mg—Al—Ca—O composite oxide contains the Mg—Al—Ca—O composite oxide which satisfies an R1/M1 ratio ranging from 4.0 to 19.0, an R2/A1 ratio ranging from 0.3 to 0.7, and an R3/C1 ratio ranging from 1.9 to 9.0 when a non-metallic inclusion, among the non-metallic inclusions, having a diameter of 5 μm or more is analyzed by EDS,
- where, when it is assumed that the sum of contents of CaO, $Al_2O_3$, and MgO in the components of the inclusions included in the steel material is set to 100%, the C1 represents an average value of the CaO contents in the respective inclusions included in the steel material, the A1 represents an average value of the $Al_2O_3$ contents, and the M1 represents an average value of the MgO contents, provided that it is meant that R1=C1+A1, R2=C1+M1, and R3=A1+M1.

2. The steel material for a pressure vessel according to claim 1, wherein the steel material further comprises 0.0020 to 0.0060% of nitrogen (N).

3. The steel material for a pressure vessel according to claim 1, wherein the steel material comprises one or two or more carbides or carbonitrides selected from Nb and V, which have a diameter of 5 to 30 nm, at an area ratio of 0.01 to 0.02% in the microstructure.

4. The steel material for a pressure vessel according to claim 3, wherein the carbides or carbonitrides comprises one or more precipitates selected from the group consisting of NbC, Nb(C,N), VC, and V(C,N).

5. The steel material for a pressure vessel according to claim 1, wherein the steel material has a tensile strength of 485 MPa or more after subjected to post-weld heat treatment (PWHT) including heating the steel material to 425° C., then heating the steel material to 595 to 630° C. at a heating rate of 55 to 100° C./hr, then maintaining the steel material at a temperature of 595 to 630° C. for 60 to 180 minutes, then cooling the steel material to 425° C. at a rate that is the same as the warming rate, and then air-cooling the steel material to room temperature.

* * * * *